United States Patent
Prakash

(10) Patent No.: US 11,720,419 B2
(45) Date of Patent: Aug. 8, 2023

(54) SYSTEM AND METHOD FOR PROVIDING A DECLARATIVE NON CODE SELF-LEARNING ADVISORY FRAMEWORK FOR ORCHESTRATION BASED APPLICATION INTEGRATION

(71) Applicant: ORACLE INTERNATIONAL CORPORATION, Redwood Shores, CA (US)

(72) Inventor: Ankur Prakash, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 525 days.

(21) Appl. No.: 16/858,271

(22) Filed: Apr. 24, 2020

(65) Prior Publication Data
US 2021/0334148 A1  Oct. 28, 2021

(51) Int. Cl.
| | |
|---|---|
| G06F 9/54 | (2006.01) |
| G06F 9/445 | (2018.01) |
| G06F 9/455 | (2018.01) |
| G06N 20/00 | (2019.01) |
| G06N 5/02 | (2023.01) |
| G06N 5/04 | (2023.01) |
| G06F 11/30 | (2006.01) |
| G06F 11/22 | (2006.01) |
| G06F 11/34 | (2006.01) |

(52) U.S. Cl.
CPC .......... *G06F 9/541* (2013.01); *G06F 9/44505* (2013.01); *G06F 9/45558* (2013.01); *G06F 11/2257* (2013.01); *G06F 11/302* (2013.01); *G06F 11/3072* (2013.01); *G06F 11/3452* (2013.01); *G06N 5/02* (2013.01); *G06N 5/04* (2013.01); *G06N 20/00* (2019.01); *G06F 2009/45595* (2013.01)

(58) Field of Classification Search
CPC .......................... G06F 11/302; G06F 11/3072
See application file for complete search history.

(56) References Cited

U.S. PATENT DOCUMENTS 10,375,189 B2 * 8/2019 Modi ...................... H04L 67/55

* cited by examiner

*Primary Examiner* — Amine Riad
(74) *Attorney, Agent, or Firm* — Tucker Ellis LLP

(57) ABSTRACT

In accordance with an embodiment, described herein are systems and methods for supporting a declarative non code self-learning advisory framework in an orchestration based application integration. The systems and methods can provide an advisory framework as a component of an integration platform which can allow declaratively defined recommendations, guidance, warnings etc. to be shown to the consumer of the platform on occurrence of certain events. The advisory framework can provide benefits such as: 1) allowing any entity to declaratively define/modify the rules and advices which will immediately get reflected across the customer fleet without dependency on product's release cadence; 2) where such updates to declaratively defined rules and advices does not involve any code changes to do the product; 3) comprises a structure which is generic and not component specific; and 4) can have self-learning capabilities from the generated product metrics.

20 Claims, 9 Drawing Sheets

US 11,720,419 B2

SYSTEM AND METHOD FOR PROVIDING A DECLARATIVE NON CODE SELF-LEARNING ADVISORY FRAMEWORK FOR ORCHESTRATION BASED APPLICATION INTEGRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to integration cloud services, and in particular, for providing a declarative non code self-learning advisory framework for orchestration based application integration.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web based integration designer for point and click integration between applications, a rich monitoring dashboard that provides real-time insight into the transactions.

SUMMARY

In accordance with an embodiment, described herein are systems and methods for supporting a declarative non code self-learning advisory framework in an orchestration based application integration. The systems and methods can provide an advisory framework as a component of an integration platform which can allow declaratively defined recommendations, guidance, warnings etc. to be shown to the consumer of the platform on occurrence of certain events. The advisory framework can provide benefits such as: 1) allowing any entity, e.g., component developer, product manager, business unit leads, etc. to declaratively define/modify the rules and advices with recommendation, guidance, warnings etc. which will immediately get reflected across the customer fleet without dependency on product's release cadence; 2) where such updates to declaratively defined rules and advices does not involve any code changes to the product so no implementation specific knowledge required; 3) comprises a structure which is generic and not component specific; and 4) can have self-learning capabilities from the generated product metrics.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a service, for example, Oracle Integration Cloud Service (ICS), can provide a cloud-based platform for building and deploying integrations flows that connect applications residing in the cloud or on-premises.

Integration Cloud Service

Figure 1:
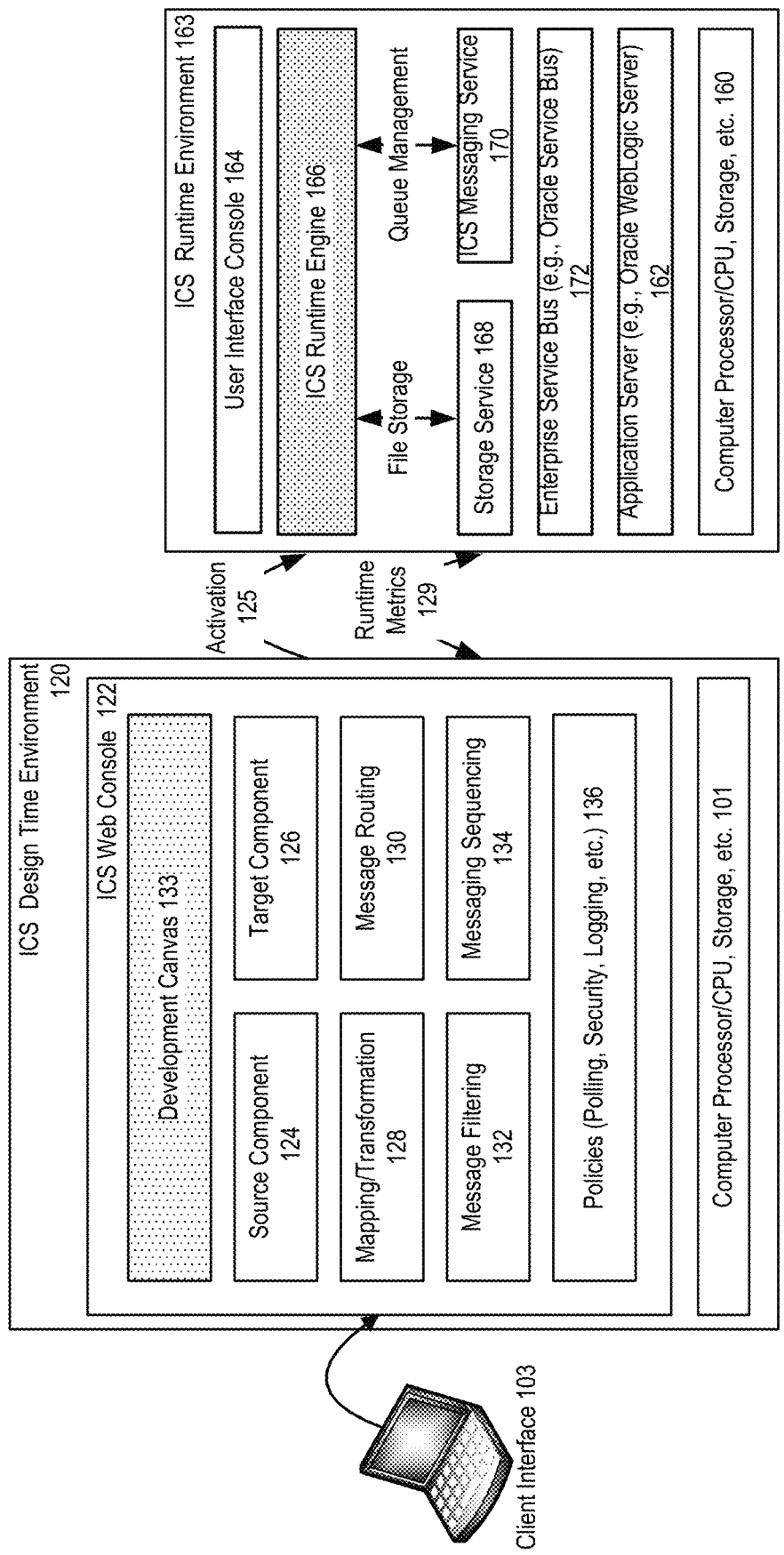
FIG. 1 illustrates an integration cloud service in accordance with an embodiment.

FIG. 1 illustrates an ICS platform for designing and executing an ICS integration flow, in according with an embodiment.

As shown in FIG. 1, the ICS platform can include a design-time environment 120, and a runtime environment 163. Each environment can execute on a computer including one or more processors, for example a computer 101 or 160.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
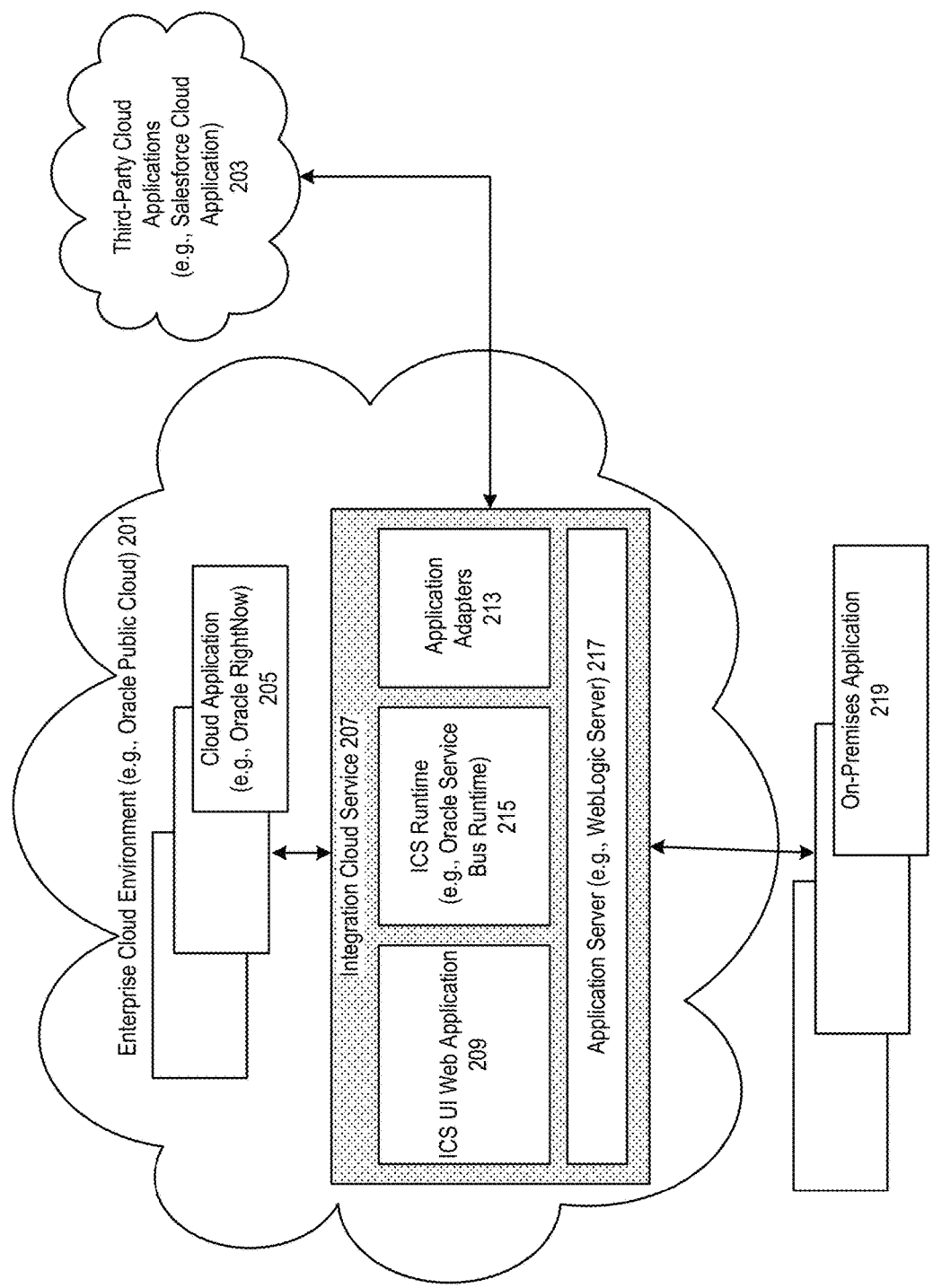
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, Oracle Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications, by handling the underlying complexities of connecting to those applications. The applications can include enterprise cloud applications of the ICS vendor 205, third-party cloud applications (for example, Salesforce) 203, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 3:
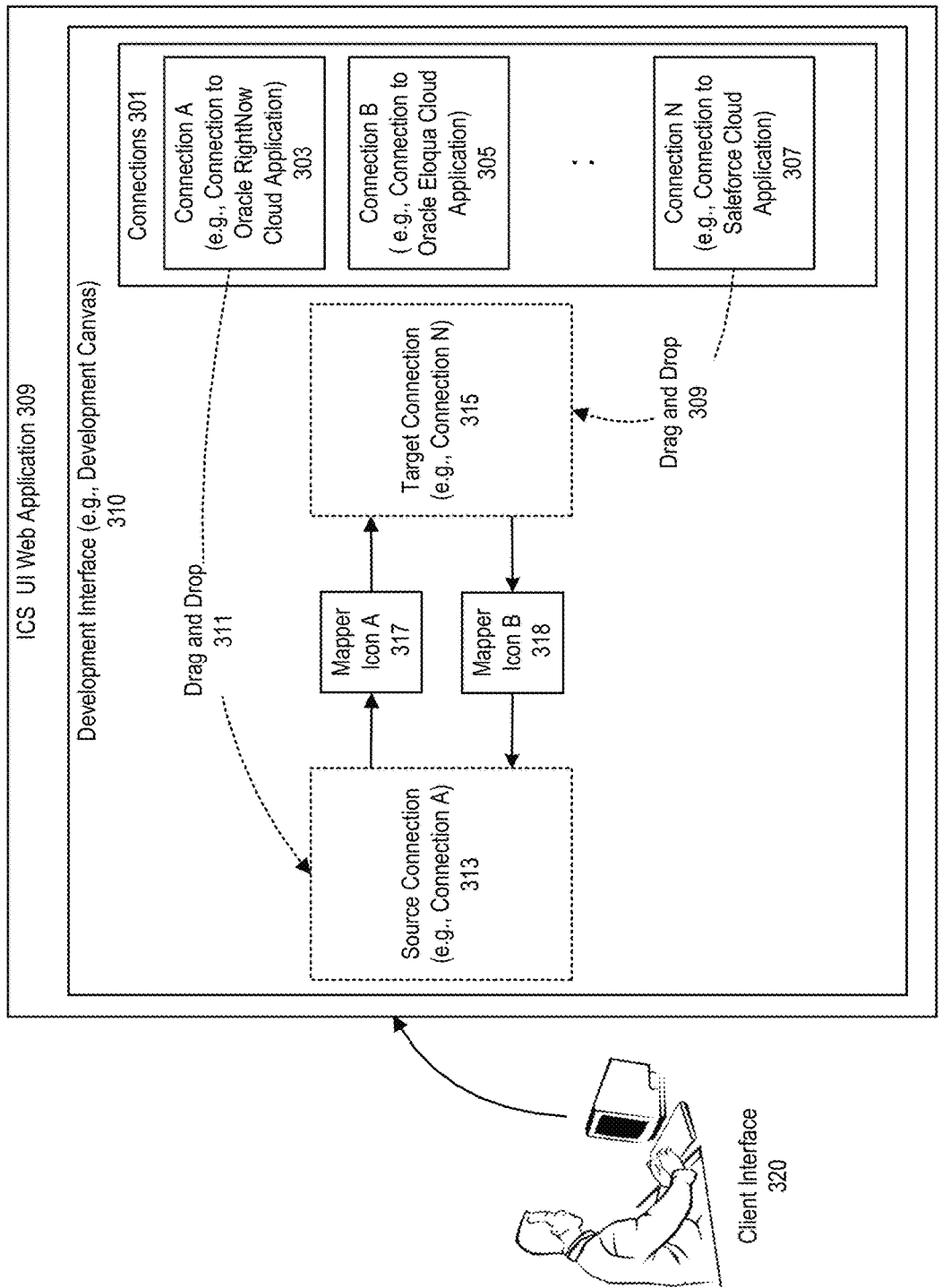
FIG. 3 illustrates an ICS design time, in accordance with an embodiment.

FIG. 3 illustrates an ICS design time, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Declarative Non Code Self-Learning Advisory Framework

In accordance with an embodiment, an integration of applications consists of multiple applications working together in an orchestration. Generally, an orchestration platform (also known as the integration platform) provides ways to interact with these applications with the help of client applications. These client applications are called connectors or adapters.

In accordance with an embodiment, when modeling, designing, building, or running an integration flow, generally speaking, an advisory framework can provide component/application specific advice, guidance, warnings, and/or other feedback to the user working with the integration platform. For example, certain adapters for a specific application requires or prefers one type of authentication method over others, such as token-based authentication. During design and/or running of an integration flow, however, the connector associated with the specific application has a credential-based authentication selected instead of token-based authentication from a number of optional authentication methods provided with the connector. Based upon the coded connector, a warning can be given that the application associated with the connector prefers and/or requires token-based authentication.

However, in accordance with an embodiment, a problem with the above solution can involve determining how to provide guidance, recommendations, warnings, and errors to the end user during design time modeling of the orchestrations, activation, or even monitoring of an active integration flow. Traditionally, integration platforms use static metadata to showcase advices or guidance to the user while modeling the flow. This method, however, requires that the guidance, warnings, or errors be hard-coded into the components of the product. Then, when, for example, an associated application is updated which would require updated guidance, warnings, or errors, the hard-coded component must be re-coded to conform to the new requirements or preferences of the associated application. Put another way, the current method not only requires code changes to the product but also depends on the product release cadence for new guidance, recommendations etc. to be pushed to the customers. Also, it is static and is not self-learning. In addition, all changes to the static code must be performed by the component developer.

In accordance with an embodiment, an advisory framework can be provided as a component of the integration product. The advisory framework can allow declaratively defined recommendations, guidance, warnings etc., to be shown to the consumer of the product on occurrence of certain events. The advisory framework can provide benefits such as: 1) allowing any entity, e.g., component developer, product manager, team leads, etc. to declaratively define the rules and advices which will immediately get reflected across the customer fleet; 2) where such updates to declaratively defined rules and advices does not involve any code changes to do the product so no implementation specific knowledge required; 3) comprises a structure which is generic and not component specific; and 4) can have self-learning capabilities from the generated product metrics.

In accordance with an embodiment, the term advice can refer to content/instructions that is displayed, via, e.g., a user-interface, to a user of the integration system. For example, advice could comprise guidance, examples, or warnings . . . etc.

In accordance with an embodiment, advice can refer to an actual recommendation/guidance/warning/error displayed/shown (e.g., via a UI or a GUI) to a client. This could consist of, but is not limited to: advice code, localized messages (e.g., cause+actions in case of warning/error, or guidance and recommendations otherwise). The advice can additionally/alternatively comprise further links to help, documents, or community portals, etc.

In accordance with an embodiment, the advice can be shown to the user at multiple places like connection page, orchestration canvas, endpoint configuration, activation page, tracking and monitoring, etc.

In accordance with an embodiment, an event can comprise a trigger, or triggering event, that causes or triggers the advice to be shown. For example, a trigger can comprise a test/save connection, activation, slowness in runtime, usage of a particular activity . . . etc. A few examples of a trigger can comprise: a save connection action, a flow activation, a save orchestration action, an indication of a completion or finishing of an adapter endpoint configuration wizard, a drag and drop action of any activity in an orchestration flow, a runtime execution or failure, etc.

In accordance with an embodiment, a pattern can comprise a high-level condition or conditions that are exposed by the framework which define the scenarios or cases where the system would like any advice to be shown. For example, a pattern could comprise using non-recommended security policies, using a deprecated API, making modeling mistakes . . . etc.

In accordance with an embodiment, an overall flow configuration, endpoint configuration, message exchange pattern, can additionally comprise patterns. That is, patterns can be agnostic of a particular use case or scenario (e.g., the bigger buckets).

In accordance with an embodiment, examples of patterns can include: use of a non-recommended (yet supported) configuration in a connection/credential/endpoint creation, use of high latency APIs in a flow (e.g., a synchronous flow), a flow calling a paginated API but not having a loop to paginate over, use of a generic adapter instead of a specific adapter, use of external APIs which are in deprecated/expired state.

In accordance with an embodiment, a rule can comprise specific instances of a pattern specific to a particular component and defined by either the component owner or any other individual or learned via artificial intelligence or machine learning. For example, a rule can comprise the use of user credentials for authentication instead of token-based authentication as security policy in an adapter for a specific application.

In accordance with an embodiment, rules can be specific so that the rules do not need information from an associated pattern. Rules can also be generic in that the rule can actually depend upon an associated pattern for advice resolution. This provides flexibility to the rules owner to either define a very specific and elaborate rule, or be very vague and directly depend on framework provided patterns.

In accordance with an embodiment, rules are specific instances of a pattern specific to a particular component and can be defined by, for example, either the component owner or any other individual or learned via AI, for e.g., usage of user credentials instead of token-based authentication as security policy for a particular adapter.

In accordance with an embodiment, rules can be associated with specific components within a pattern defined by the component owner (i.e., within the bigger pattern buckets). Some examples of rules are, use of user credentials instead of token-based authentication for a specific adapter, use of bulk data extracts in a synchronous flow, use of asynchronous operations in a specific adapter without having a loop in the flow to get results, use of a SOAP adapter instead of a HCM adapter for an HCM extract, use of expired versions of application APIs in a specific adapter.

In accordance with an embodiment, advice can be associated with a level (e.g., severity). This can range from guidance, meaning information and assistance for a customer to make informed decisions while configuring/modeling, a recommendation, meaning recommendations based upon, e.g., historical usage, best practices, or recommended patterns, a warning, or an error.

In accordance with an embodiment, the systems and methods can support endpoint creation with declarative non code self-learning advisory framework. Such a process for of endpoint creation can follow: an advisory framework can detect a registered endpoint creation event (e.g., the creation of a connector/adapter). The advisory framework can instantiate hooks onto an artifact generation to recognize the occurrence of this event. No code change is required at a specific adapter level. The advisory framework automatically kicks in on artifact generation irrespective of the adapter. The advisory framework can check whether the specific adapter has rules defined for this event. If yes, advisory framework fetches the connection and operation properties from the context. The advisory framework can run the defined condition against the fetched properties and sends out the advice if satisfied.

In accordance with an embodiment, the systems and methods can support flow activation with declarative non code self-learning advisory framework. Such a process for flow activation can provide for the advisory framework to activate/monitor the flow in whenever a flow is activated. In a specific embodiment, for example, the advisory framework can hooks onto an activation handle (e.g., "handleActivation") event being raised for the endpoints. No code change is required in any specific component. The advisory framework receives the flow information and also receives the harvested metadata for each endpoint. Advisory framework runs the defined condition against the harvested metadata and sends out the advice if satisfied.

In accordance with an embodiment, a connection can leverage the advisory framework by defining the constructs, i.e. Patterns, Rules, Events etc. as per product's needs. (The framework works with the presence of these constructs as well as the interceptors, implemented by the product to hook on to the framework.) Patterns can be provided by the product itself at a high level and the rules can be provided by the components of that product. The product can also generate the data for advisory framework to consume and run its rules against. Finally, the product can implement the interceptors to intercept the events and invoke the framework to compute the rules and return the advices.

Figure 4:
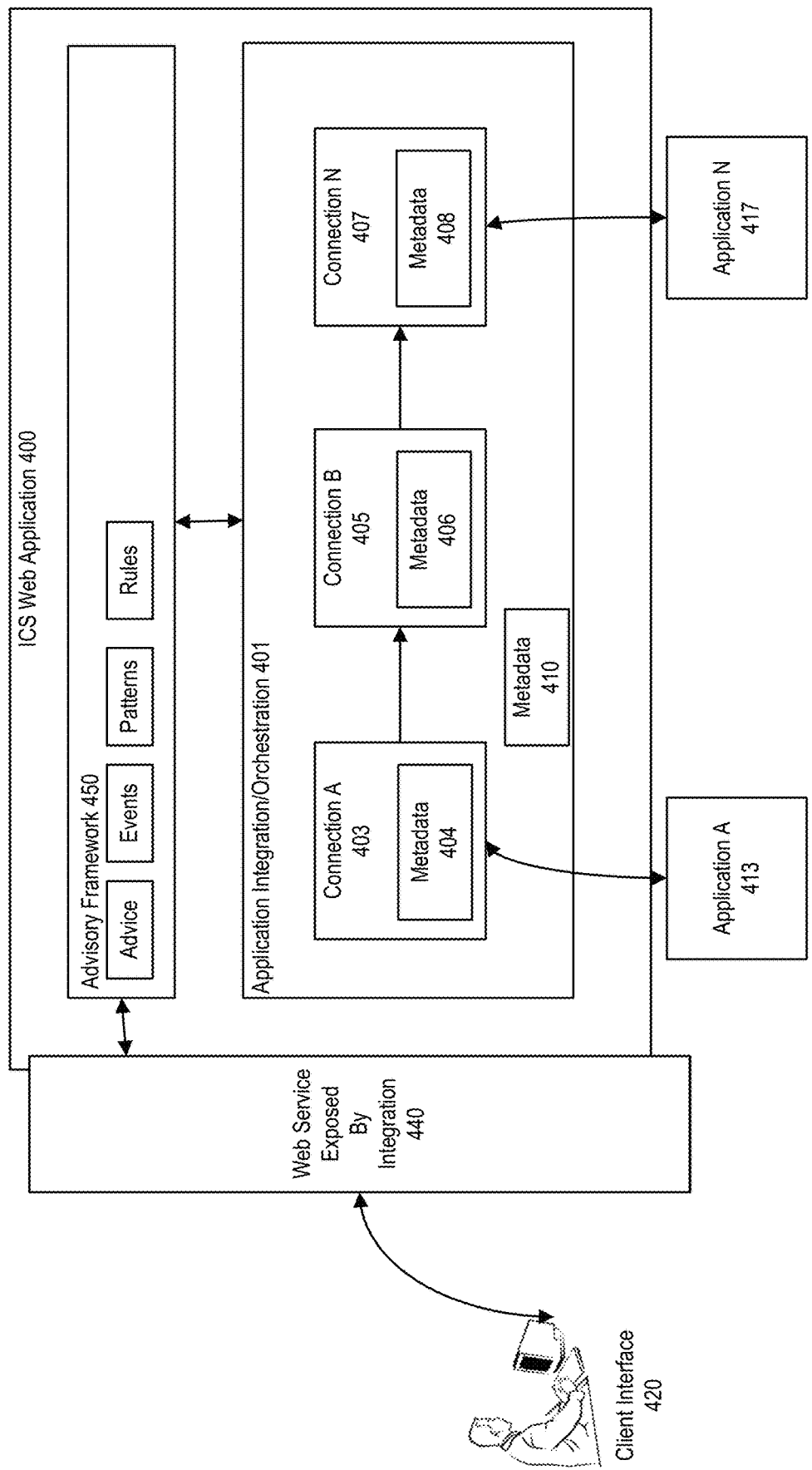
FIG. 4 illustrates a system for supporting a declarative non code self-learning advisory framework in an orchestration based application integration, in accordance with an embodiment.

FIG. 4 illustrates a system for supporting a declarative non code self-learning advisory framework in an orchestration based application integration, in accordance with an embodiment.

In accordance with an embodiment, an ICS Web Application 400 can comprise an application integration/orchestration 401 tool that can be used to design, test, and/or run an orchestration, such as the orchestration comprising connection A 403, connection B 405, and connection N 407. Each of the connections can be associated with or linked with an application, such as applications A and N 413 and 417, as shown in the figure. Integrations can additionally be associated with more or fewer connections/connectors (not shown), which can additionally be associated with additional applications (not shown).

In accordance with an embodiment, a user, via a client interface 420, can access a web service exposed by an integration 440. Via this web service, the user can interact with the application integration to, for example, design, test, or run orchestrations, such as orchestration 401.

In accordance with an embodiment, each of the connections, connection A-N, can be associated with a set of metadata, such as metadata 404, 406, and 408. Such metadata can be associated with the connection and/or associated applications, such as application A 413 and application N 417

In accordance with an embodiment, the orchestration 401 shown in the figure can be associated with metadata 410 (which can be exposed/published to the client interface via the web service 440). Such metadata 410 can comprise a total metadata profile for the orchestration, which can, for example, represent a lowest common denominator for the orchestration, as well as other attributes and capabilities of the complete orchestration.

In accordance with an embodiment, an advisory framework 450 can additionally be provided within the web application 400. This advisory framework can be associated with a specific application integration, or the advisory framework can be associated with a number of application integrations.

In accordance with an embodiment, the advisory framework can comprise an advice module, an events module, a pattern module, and a rules module. Each of the modules can be stored in, for example, a memory accessible by the advisory framework.

In accordance with an embodiment, as described above, the advice module, the events module, the pattern module, and the rules module can be updated separate and apart from any updates to a connector. That is, for example, if Application A 413 changes its preferred authentication method from token-based authentication to a credential based authentication, then an advice, event, pattern, and/or rule associated with connection A 403 can be updated independently from any update to the connection A 403.

In accordance with an embodiment, the advisory framework 450 can, for example, based upon a detected event of a number of events defined at the advisory framework, provide a hook in which one or more patterns, of a number of patterns defined at the advisory framework, can be detected. Upon detecting a pattern, a rule can, if defined for a pattern, can trigger, and advice can be given via the web serviced exposed by integration.

Figure 5:
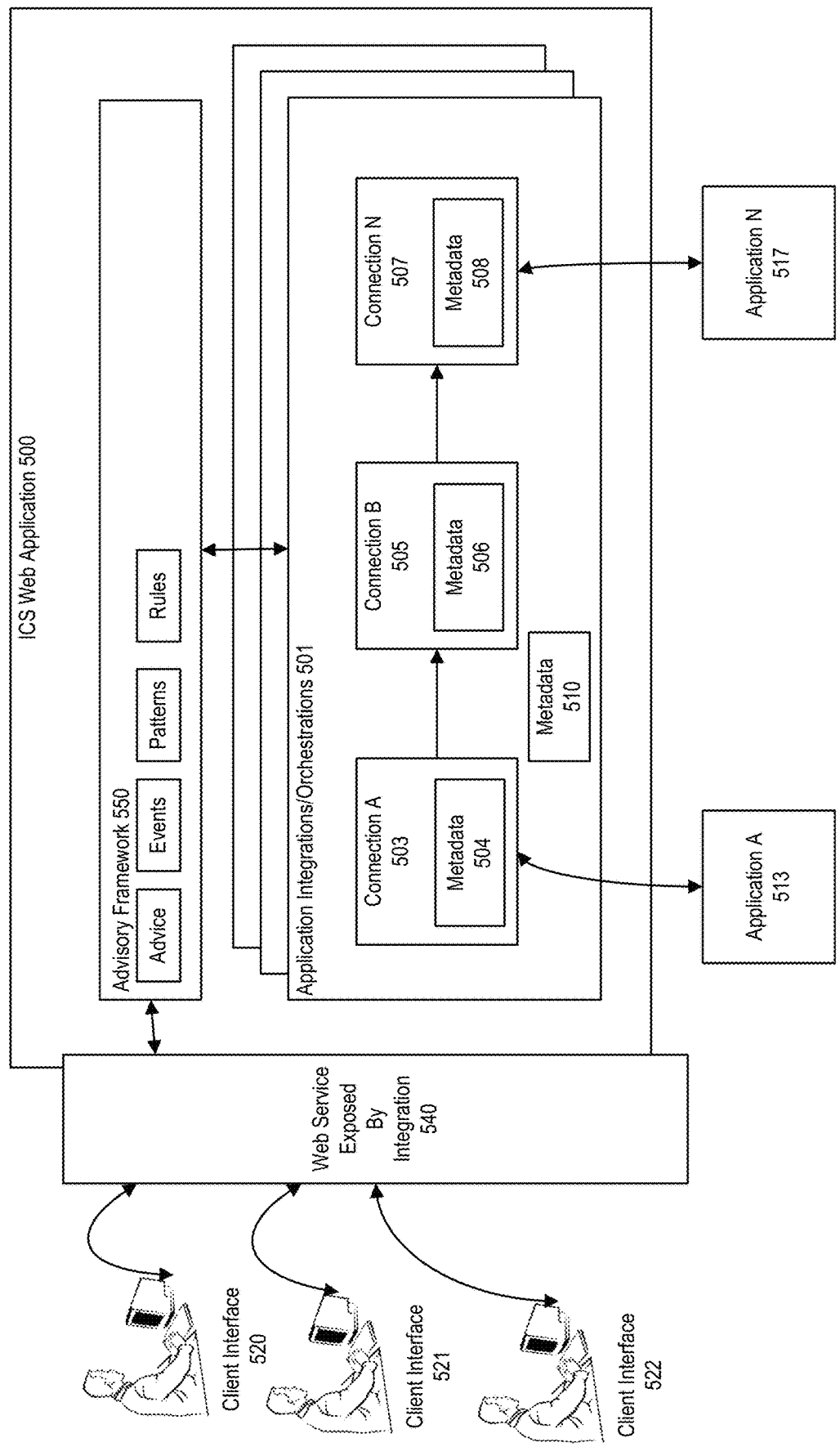
FIG. 5 illustrates a system for supporting a declarative non code self-learning advisory framework in an orchestration based application integration, in accordance with an embodiment.

FIG. 5 illustrates a system for supporting a declarative non code self-learning advisory framework in an orchestration based application integration, in accordance with an embodiment.

In accordance with an embodiment, an ICS Web Application 500 can comprise multiple application integrations/orchestrations 501 tools that can be used to design, test, and/or run an orchestration, such as the orchestration comprising connection A 503, connection B 505, and connection N 507. Each of the connections can be associated with or linked with an application, such as applications A and N 513 and 517, as shown in the figure. Integrations can additionally be associated with more or fewer connections/connectors (not shown), which can additionally be associated with additional applications (not shown).

In accordance with an embodiment, users, via client interfaces 520, 521, and 522, can access a web service exposed by an integration 540. Via this web service, the user can interact with the application integration to, for example, design, test, or run orchestrations, such as one or more of orchestrations 501.

In accordance with an embodiment, each of the connections, connection A-N, can be associated with a set of metadata, such as metadata 504, 506, and 508. Such metadata can be associated with the connection and/or associated applications, such as application A 513 and application N 517

In accordance with an embodiment, the orchestration 501 shown in the figure can be associated with metadata 510 (which can be exposed/published to the client interface via the web service 540). Such metadata 510 can comprise a total metadata profile for the orchestration, which can, for example, represent a lowest common denominator for the orchestration, as well as other attributes and capabilities of the complete orchestration.

In accordance with an embodiment, an advisory framework 550 can additionally be provided within the web application 500. This advisory framework can be associated with a specific application integration, or the advisory framework can be associated with a number of application integrations.

In accordance with an embodiment, the advisory framework can comprise an advice module, an events module, a pattern module, and a rules module. Each of the modules can be stored in, for example, a memory accessible by the advisory framework.

In accordance with an embodiment, because the connections, such as connections A, B, and N, can be common throughout the multiple orchestrations (that is, one connector can be used in many orchestrations without changing the connector), the advice, events, patterns, and rules modules of the advisory framework can likewise support multiple users interacting with multiple application integrations/orchestrations simultaneously.

In accordance with an embodiment, as described above, the advice module, the events module, the pattern module, and the rules module can be updated separate and apart from any updates to a connector. That is, for example, if Application A 513 changes its preferred authentication method from token-based authentication to a credential based authentication, then an advice, event, pattern, and/or rule associated with connection A 503 can be updated independently from any update to the connection A 503.

In accordance with an embodiment, the advisory framework 550 can, for example, based upon a detected event of a number of events defined at the advisory framework, provide a hook in which one or more patterns, of a number of patterns defined at the advisory framework, can be detected. Upon detecting a pattern, a rule can, if defined for a pattern, can trigger, and advice can be given via the web serviced exposed by integration.

Figure 6:
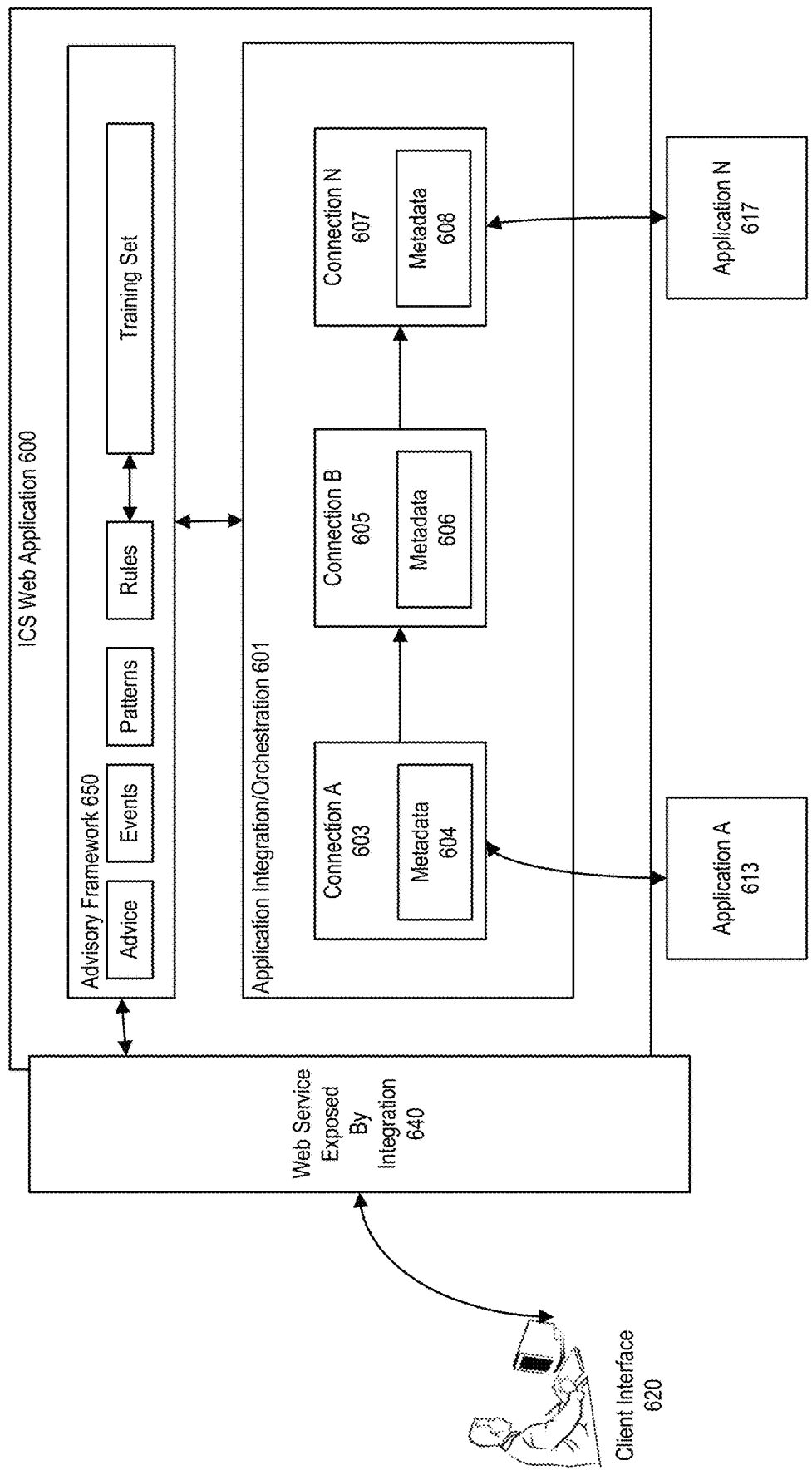
FIG. 6 illustrates a system for supporting a declarative non code self-learning advisory framework in an orchestration based application integration, in accordance with an embodiment.

FIG. 6 illustrates a system for supporting a declarative non code self-learning advisory framework in an orchestration based application integration, in accordance with an embodiment.

In accordance with an embodiment, an ICS Web Application 600 can comprise an application integration/orchestration 601 tool that can be used to design, test, and/or run an orchestration, such as the orchestration comprising connection A 603, connection B 605, and connection N 607. Each of the connections can be associated with or linked with an application, such as applications A and N 613 and 617, as shown in the figure. Integrations can additionally be associated with more or fewer connections/connectors (not shown), which can additionally be associated with additional applications (not shown).

In accordance with an embodiment, a user, via a client interface 620, can access a web service exposed by an integration 440. Via this web service, the user can interact with the application integration to, for example, design, test, or run orchestrations, such as orchestration 401.

In accordance with an embodiment, each of the connections, connection A-N, can be associated with a set of metadata, such as metadata 604, 606, and 608. Such metadata can be associated with the connection and/or associated applications, such as application A 613 and application N 617

In accordance with an embodiment, the orchestration 601 shown in the figure can be associated with metadata 610 (which can be exposed/published to the client interface via the web service 640). Such metadata 610 can comprise a total metadata profile for the orchestration, which can, for example, represent a lowest common denominator for the orchestration, as well as other attributes and capabilities of the complete orchestration.

In accordance with an embodiment, an advisory framework 650 can additionally be provided within the web application 600. This advisory framework can be associated with a specific application integration, or the advisory framework can be associated with a number of application integrations.

In accordance with an embodiment, the advisory framework can comprise an advice module, an events module, a pattern module, and a rules module. Each of the modules can be stored in, for example, a memory accessible by the advisory framework.

In accordance with an embodiment, as described above, the advice module, the events module, the pattern module, and the rules module can be updated separate and apart from any updates to a connector. That is, for example, if Application A 613 changes its preferred authentication method from token-based authentication to a credential based authentication, then an advice, event, pattern, and/or rule associated with connection A 603 can be updated independently from any update to the connection A 603.

In accordance with an embodiment, the advisory framework 650 can, for example, based upon a detected event of a number of events defined at the advisory framework, provide a hook in which one or more patterns, of a number of patterns defined at the advisory framework, can be detected. Upon detecting a pattern, a rule can, if defined for a pattern, can trigger, and advice can be given via the web serviced exposed by integration.

In accordance with an embodiment, a training set, combined with machine learning and/or artificial intelligence, can be used to define a number of rules of the advisory framework.

In accordance with an embodiment, the use of the training set with AI/ML can be used since the rules are declarative and not coded. In this way, the systems and methods can depend on any ML data set to generate the rules. The advisory framework facilitates this by providing APIs which the machine learning (ML) engine can use to generate the rules. The data set can be any source, for e.g., the metrics which the product collects.

Figure 7:
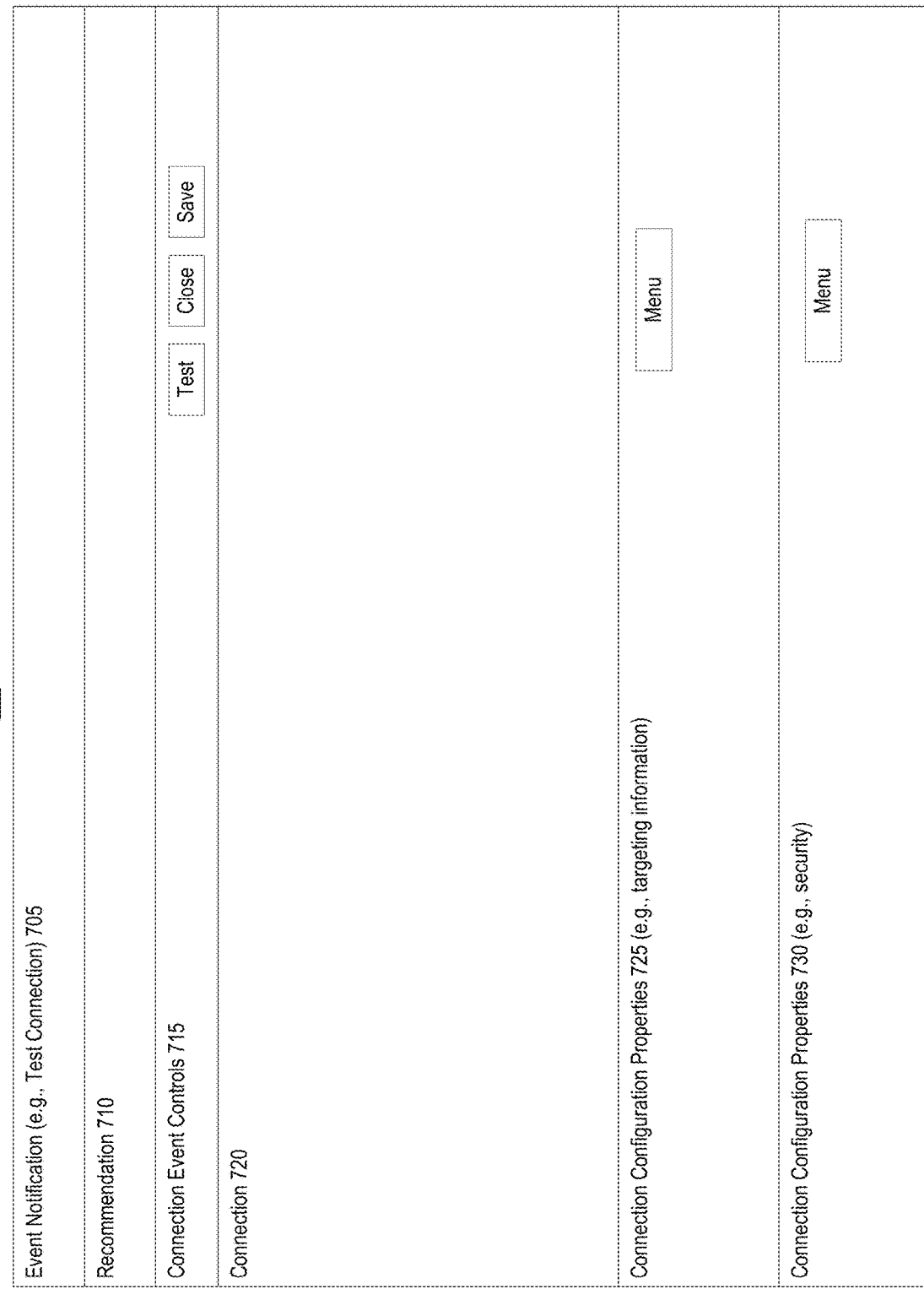
FIG. 7 illustrates a screenshot from a system for supporting a declarative non code self-learning advisory framework in an orchestration based application integration, in accordance with an embodiment.

FIG. 7 illustrates a screenshot from a system for supporting a declarative non code self-learning advisory framework in an orchestration based application integration, in accordance with an embodiment.

More specifically, FIG. 7 illustrates a screenshot from an exemplary connection configuration control page, in accordance with an embodiment.

In accordance with an embodiment, as shown in the exemplary screenshot 700, the system can display, for example via a graphical user interface of the integration platform, certain recommendations 710 based upon a number of factors.

In accordance with an embodiment, for example, a recommendation 710 can be displayed when, for example, an event is detected by the advisory framework. Such an event can comprise, for example, a test connection. In such situations, the GUI of the platform can display such information in an event notification 705 portion of the display.

In accordance with an embodiment, information contained in the portions of the display 705 and 710 can be generated by the advisory framework based on, for example, inputs received related to the connection 720. The connection 720 can be configured via multiple configuration properties, such as configuration properties 725 and 730. As examples, these configuration properties can comprise targeting information (e.g., the target endpoint of the connection 720, such as an instance of a related application) as well as security configuration properties (e.g., a selection of a security authentication method). Such configuration properties can be accessed and controlled, for example, via inputs selected from menus associated with each configuration property. As an example, within connection configuration property 730, a menu can comprise a pull-down menu of a plurality of security authentication methods available to be selected that have been coded into the connection 720.

In accordance with an embodiment, the integration platform can additionally receive, or automatically run, a number of connection event controls 715. For example, a connection event control can comprise a test of a connection 720, or a save of the connection with a number of current configuration properties.

In accordance with an embodiment, when an event is triggered or detected (e.g., the advisory framework can be configured to detect patterns based upon received inputs related to events, or can automatically check for events irrespective of received inputs), the advisory framework discussed above can check the connection (or an entire integration) for one or more patterns. When a pattern is detected, the advisory framework can check against a further defined rules to determine if a recommendation should be presented. As an example, if a selected security authentication method was selected in 730 that does not fall into a rule defined for connection 720, a recommendation 710 can be presented to a user, via the GUI, prompting a selection of the recommended security authentication method.

In accordance with an embodiment, a connection event control 715 can comprise a test of connection 720. When detected by the advisory framework, the event can trigger a comparison of the configured connection configuration properties 725 and 730 against a number of patterns defined for the connection 720 at the advisory framework. If a pattern is found, the advisory framework can check the triggered pattern against a number of rules. If, for example, the pattern comprises a selection of a security authentication method, the rule can comprise a recommendation to use a certain security authentication method. If the property 730 is not the recommended certain security authentication method, then a recommendation 710 can be presented prompting a user to make a different selection at the connection configuration property 730. Such a recommendation 710 can be drawn directly from the advice module as defined within the advisory framework (i.e., when defined for the connection 720), or it can be generic advice defined from an associated pattern.

Figure 8:
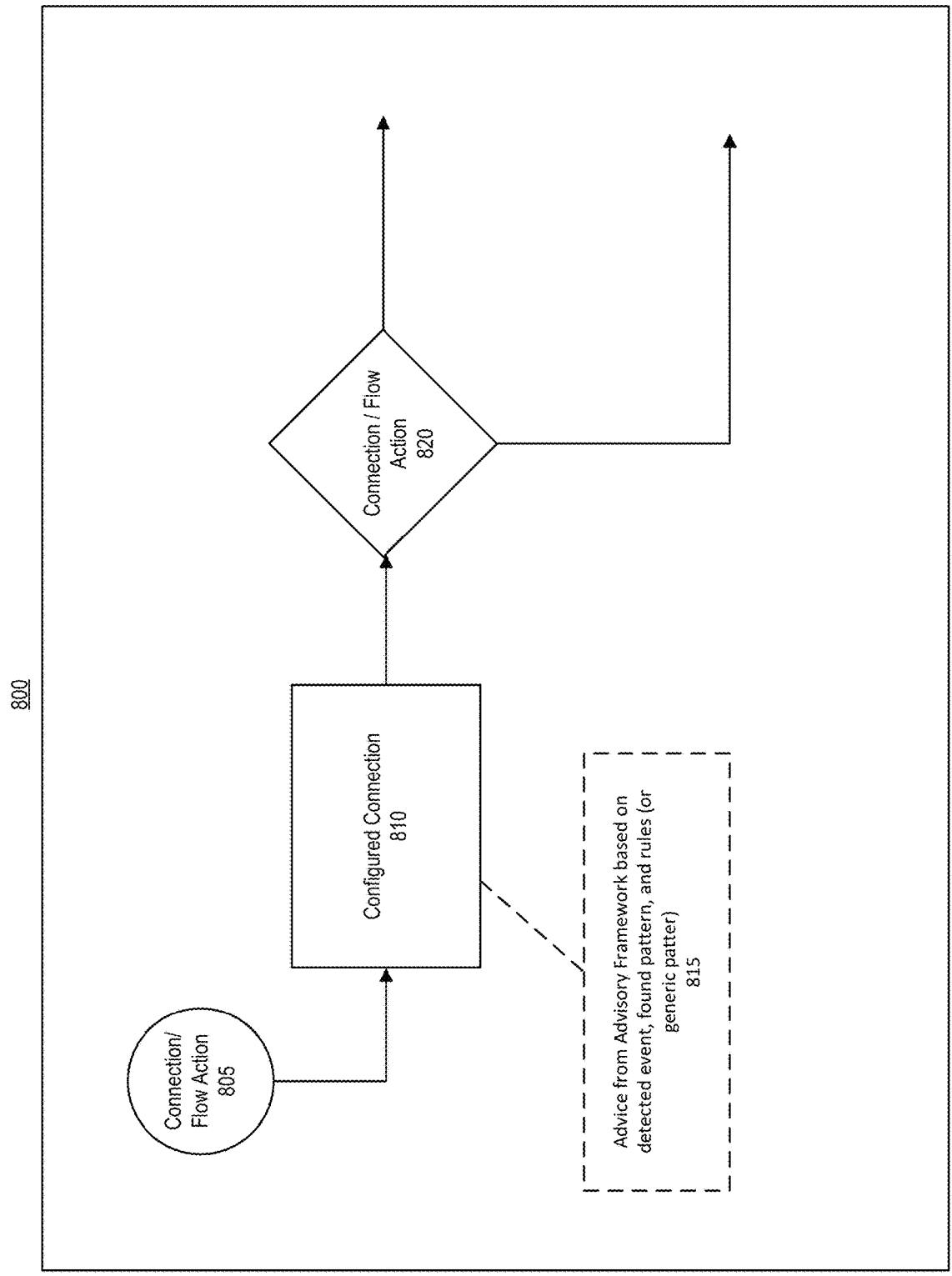
FIG. 8 illustrates a screenshot from a system for supporting a declarative non code self-learning advisory framework in an orchestration based application integration, in accordance with an embodiment.

FIG. 8 illustrates a screenshot from a system for supporting a declarative non code self-learning advisory framework in an orchestration based application integration, in accordance with an embodiment.

More specifically, FIG. 8 illustrates a screenshot from an exemplary orchestration canvas page, in accordance with an embodiment.

In accordance with an embodiment, the advice based upon a detected rule and/or a pattern (in the case of a generic rule) can be displayed within an integration flow orchestration canvas 800, as shown.

In accordance with an embodiment, when designing and testing an integration flow within an integration flow orchestration canvas 800, advice, as described above, can be displayed via a GUI based upon a detected event.

In accordance with an embodiment, the integration flow as shown comprises a connection/flow action 805, a configured connection/endpoint 810, and a connection/flow action 820.

In accordance with an embodiment, upon a detected event (e.g., an endpoint being created/edited on the canvas 800), an advisory framework can detect one or more patterns associated with the configured connection 810. Based upon a comparison with defined rules associated with the configured connection, an advice 815 can be displayed via the GUI. Such advice 815 can be defined within the advisory framework for the specific connection, or it can be more generic advice based upon the detected pattern, depending upon the level of detail of the rule checked against.

Advice

In accordance with an embodiment, the below table 1 shows the fields of an advice as defined within an advisory framework:

TABLE 1

| Field Name | | Example Value | Description |
| --- | --- | --- | --- |
| Advice Code | Required | ML-ADVICE-0001 | Not necessarily shown to user |
| Cause | Optional | | |
| Body | Required | "Do not use high latency API in synchronous flow" | Discuss probable actions/recommendations user can take. |
| Links | Optional | | Can have multiple links. E.g., to community forums/help guides. |

In accordance with an embodiment, below is shown an example of defined advices related to a specification application that can be contained within an advisory framework:

```
{
  "advices" : [
    {
      "advice_code" : "ML-ADVICE-001",
      "cause" : "",
      "message" : "Don't use high latency API in a synchronous flow",
      "links" : ""
    },
    {
      "advice_code" : "ML-ADVICE-002",
      "cause" : "",
      "message" : "Application recommends using Token Based Authentication instead of User Credentials",
      "links" : ""
    },
    {
      "advice_code" : "ML-ADVICE-003",
      "cause" : "",
      "message" : "We notice that you have configured Application search operation. Here is the guidance to help you model your flow.",
      "links" : ""
    },
    {
      "advice_code" : "ML-ADVICE-004",
      "cause" : "",
      "message" : "We notice that you are calling a high latency ERP API in a synchronous flow.",
      "links" : ""
    }
  ]
}
```

Events

In accordance with an embodiment, the below table 2 shows fields of an event as defined within an advisory framework:

TABLE 2

| Field Name | | Example Value | Description |
| --- | --- | --- | --- |
| Event Code | Required | ML-EVENT-FLOWACT | An identifier to identify an event |
| Description | Required | When an Integration Flow is activated | A short description of the event |
| Event Condition | Required | "host.clould.adapter.api.activation.HandlesActivation:handleActivation" | A condition which specifies when the event is considered triggered, i.e., the hook point within the application for Adapter framework to trigger evaluation of rules. |

In accordance with an embodiment, below are shown a number of pseudo code examples of events that can be contained within an advisory framework:

```
"events" : [
  {
    "event_code" : "ML-EVENT-SAVCON",
    "description" : "When the Save Connection button is clicked",
    "eventCondition" : "host.tip.tools.ide.adapters.cloud.api.model:getMetadataDownloadHandler"
  },
  {
    "event_code" : "ML-EVENT-TESTCON",
    "description" : "When the Test Connection button is clicked",
    "eventCondition" : "host.tip.tools.ide.adapters.cloud.api.connection.CloudConnection:ping"
  },
  {
    "event_code" : "ML-EVENT-FLOWACT",
    "description" : "When an Integration Flow is activated",
    "eventCondition" : "host.cloud.adapter.api.activation.HandlesActivation:handleActivation"
  },
  {
    "event_code" : "ML-EVENT-EP-CREATION",
    "description" : "When an adapter endpoint is created",
    "eventCondition" : "host.tip.tools.ide.adapters.cloud.api.generation.ArtifactGenerator:generate"
  }
]
```

Patterns

In accordance with an embodiment, the below table 3 shows the fields of a pattern as defined within an advisory framework:

TABLE 3

| Field Name | | Example Value | Description |
| --- | --- | --- | --- |
| Pattern Code | Required | ML-PATTERN-002 | An identifier to identify a pattern |
| Description | Required | Use of a high latency API in a synchronous flow | A short description of the pattern |
| Associated Event(s) | Optional | ML-EVENT-RUNEXE | Could be one or more This could be defined here or at an associated rule. If defined at both places, then rule condition takes precedence. |
| Associated Advice | Optional | ML-ADVICE-001 | This could be defined here or at the rule. If defined in both places, then rule condition takes precedence. |
| Level | Optional | 03 | A defined level type |
| Condition | Optional | trackingInfo.duration > 300 | This could be defined here or at the rule. If defined in both places, then rule condition takes precedence. |

In accordance with an embodiment, a level can be defined, for example, as follows: 01—Guidance, 02—Recommendation, 03—Warning, 04—Error.

In accordance with an embodiment, below are shown a number of pseudo code examples of patterns that can be contained within an advisory framework:

```
"patterns" : [
    {
        "pattern_code" : "ML-PATTERN-001",
        "description" : "If a non-recommended security policy is used in connection",
        "associated_events" : [
            "ML-EVENT-TESTCON"
        ],
        "associated_advice" : "",
        "level" : 2,
        "condition" : ""
    },
    {
        "pattern_code" : "ML-PATTERN-002",
        "description" : "Use of a high latency API in a synchronous flow",
        "associated_events" : [
```

-continued

```
            "ML-EVENT-FLOWACT",
            "ML_EVENT_SLOWPER"
        ],
        "associated_advice" : "ML-ADVICE-001",
        "level" : 3,
        "condition" : ""
    },
    {
        "pattern_code" : "ML-PATTERN-003",
        "description" : "Flow Modelling guidance on endpoint creation.",
        "associated_events" : [
            "ML-EVENT-EP-CREATION"
        ],
        "associated_advice" : "",
        "level" : 1,
        "condition" : ""
    }
]
```

Rules

In accordance with an embodiment, the below table 4 shows fields of a rule, as defined within an advisory framework:

TABLE 4

| Field Code | | Example Value | Description |
| --- | --- | --- | --- |
| Rule Code | Required | ML-RULE-APP-002 | An identifier to identify a pattern |
| Associated Pattern | Required | ML-PATTER-002 | Associates the rule with a pattern. By such association, rule inherits properties of pattern. |
| Associated Event(s) | Optional | ML-EVENT-FLOWACT | If not provided: rule inherits associated pattern's associated events. If provided: overrides the associated pattern's associated events. |
| Associated Advice | Optional | ML-ADVICE-001 | If not provided: rule inherits associated pattern's advice. If provided: overrides the associated pattern's advice. |

TABLE 4-continued

| Field Code | | Example Value | Description |
|---|---|---|---|
| Level | Optional | 03 | If not provided: rule inherits associated pattern's level. If provided: overrides the associated pattern's level. |
| Condition | Optional | (normalizedJSON.external APIInvocationStyle = "SYNC_REQ_RESP" AND normalizedJSON.external APIGroup LIKE "SEARCH %") AND NOT connectionProperties.securityPolicy IN ("CUSTOM", "SOMETHING") | If not provided: rule inherits associated pattern's level. If provided: overrides the associated pattern's level. |

In accordance with an embodiment, a level can be defined, for example, as follows: 01—Guidance, 02—Recommendation, 03—Warning, 04—Error.

In accordance with an embodiment, below is shown a pseudo code example of a rule that can be contained within an advisory framework:

```
{
    "rules" : [
    {
        "rule_code" : "ML-RULE-APP-001",
        "associated_pattern" : "ML-PATTERN-001",
        "associated_events" : [ ],
        "associated_advice" : "ML-ADVICE-002",
        "level" : 2,
        "condition" : "connectionProperties.securityPolicy = 'CUSTOM'"
    },
    {
        "rule_code" : "ML-RULE-APP-002",
        "associated_pattern" : "ML-PATTERN-003",
        "associated_events" : [
        "ML-EVENT-EP-CREATION"
        ],
        "associated_advice" : "ML-ADVICE-003",
        "level" : 1,
        "condition" : "operationProperties.targetOperation = 'search'"
    }
    ]
}
```

In accordance with an embodiment, below is shown a pseudo code example of a rule that can be contained within an advisory framework:

```
{
    "rules" : [
    {
        "rule_code" : "ML-RULE-ERP-002",
        "associated_pattern" : "ML-PATTERN-002",
        "associated_events" : [
        "ML-EVENT-FLOWACT"
        ],
        "associated_advice" : "",
        "level" : 3,
        "condition" : "normalizedProperties.outboundInvocationArtifactType = 'FBDI_JOB' AND normalizedProperties.outboundInvocationInvocationStyle = 'SYNC_REQUEST_RESPONSE' AND normalizedProperties.outboundInvocationArtifactValue = 'Import External Transactions'"
    }
    ]
}
```

In accordance with an embodiment, below is shown a pseudo code example of a rule that can be contained within an advisory framework:

```
{
    "rules" : [
    {
        "rule_code" : "ML-RULE-APP-002",
        "associated_pattern" : "ML-PATTERN-002",
        "associated_events" : [
        "ML-EVENT-FLOWACT"
        ],
        "associated_advice" : "",
        "level" : 3,
        "condition" : "normalizedProperties.outboundInvocation InvocationStyle = 'SYNC_REQUEST_RESPONSE' AND normalizedProperties.integrationOperationName = 'Batch'"
    }
    ]
}
```

Figure 9:
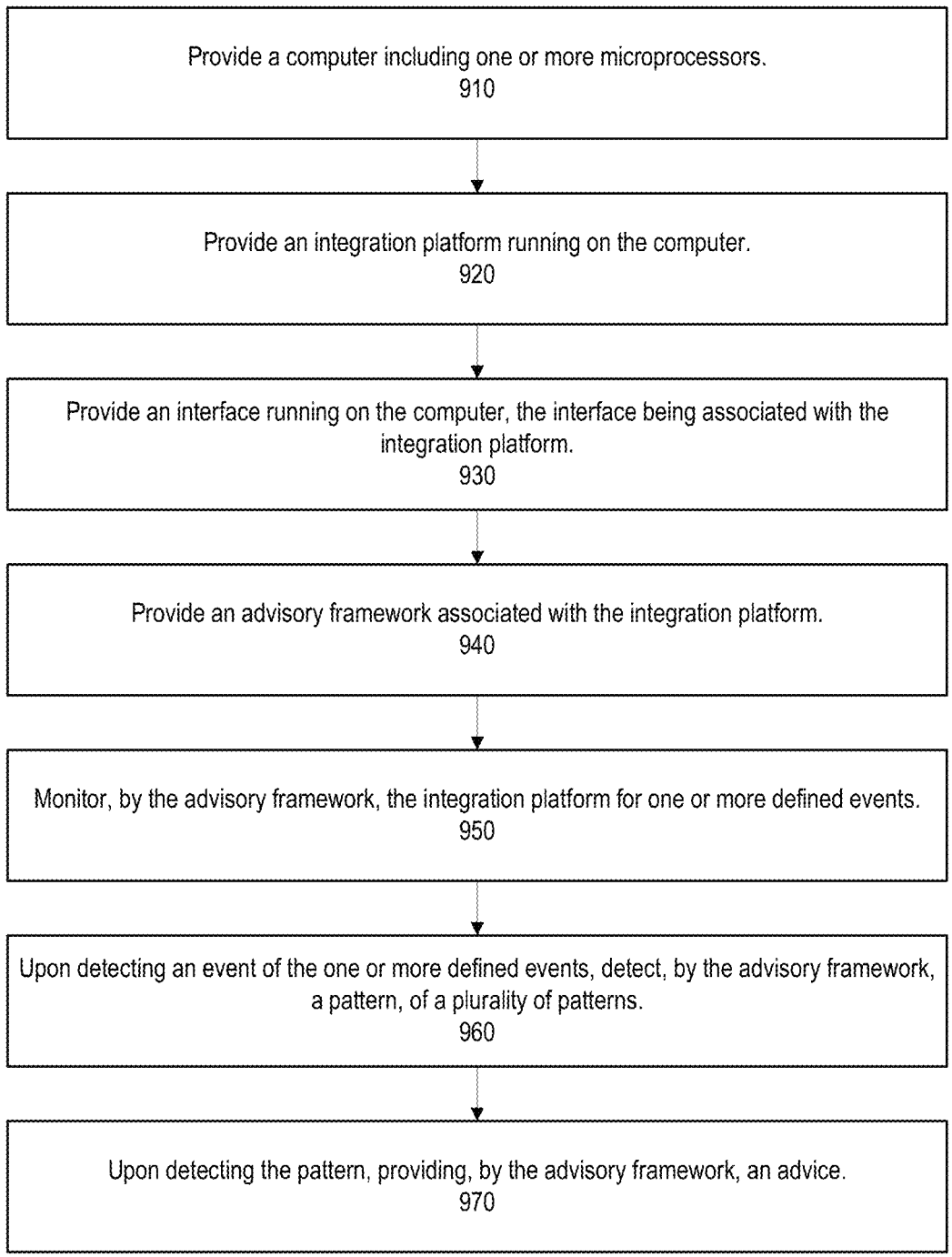
FIG. 9 is a flowchart of a method for supporting a declarative non code self-learning advisory framework in an orchestration based application integration, in accordance with an embodiment.

FIG. 9 is a flowchart of a method for supporting a declarative non code self-learning advisory framework in an orchestration based application integration, in accordance with an embodiment.

In accordance with an embodiment, at step 910, a method can provide a computer including one or more microprocessors.

In accordance with an embodiment, at step 920, a method can provide an integration platform running on the computer.

In accordance with an embodiment, at step 930, a method can provide an interface running on the computer, wherein the interface is associated with the integration platform.

In accordance with an embodiment, at step 940, a method can provide an advisory framework associated with the integration platform.

In accordance with an embodiment, at step 950, a method can monitor, by the advisory framework, the integration platform for one or more defined events.

In accordance with an embodiment, at step 960, a method can, upon detecting an event of the one or more defined events, detect, by the advisory framework, a pattern of a plurality of defined patterns.

In accordance with an embodiment, at step 970, a method can, upon the detection of the pattern, provide, by the advisory framework, an advice.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting a declarative non code self-learning advisory framework in an orchestration based application integration, comprising:
    a computer including one or more microprocessors;
    an integration platform running on the computer;
    an interface running on the computer, wherein the interface is associated with the integration platform; and
    an advisory framework associated with the integration platform;
    wherein the advisory framework monitors the integration platform for one or more defined events associated with an integration flow at the integration platform;
    wherein upon detecting an event of the one or more defined events, the advisory framework detects a pattern of a plurality of defined patterns; and
    wherein upon the detection of the pattern, the advisory framework provides an advice selected from a plurality of advices stored at a memory accessible by the advisory framework, wherein the plurality of advices are configured to be updated independently of any updates to the integration flow.

2. The system of claim 1,
    wherein the pattern is detected in the context of a component of the integration platform, the component being associated with an application.

3. The system of claim 2,
    wherein the providing of the advice is contingent upon the satisfaction of a rule associated with the component, of a plurality of rules defined at the advisory framework.

4. The system of claim 3,
    wherein the plurality of advices are associated with the component.

5. The system of claim 4,
    wherein the provided advice comprises a level, the level corresponding to a severity of the provided advice.

6. The system of claim 4,
    wherein instructions indicative of an update to at least one advice of the plurality of advices are received, the at least one advice being associated with the component; and
    wherein the at least one advice of the plurality of advices is updated separate from any update to the associated component.

7. The system of claim 6,
    wherein the interface comprises a graphical user interface, the graphical user interface displaying a component configuration page corresponding to the component.

8. A method for supporting a declarative non code self-learning advisory framework in an orchestration based application integration, comprising:
    providing a computer including one or more microprocessors;
    providing an integration platform running on the computer;
    providing an interface running on the computer, wherein the interface is associated with the integration platform;
    providing an advisory framework associated with the integration platform;
    monitoring, by the advisory framework, the integration platform for one or more defined events associated with an integration flow at the integration platform;
    upon detecting an event of the one or more defined events, detecting, by the advisory framework, a pattern of a plurality of defined patterns; and
    upon the detection of the pattern, providing, by the advisory framework, an advice selected from a plurality of advices stored at a memory accessible by the advisory framework, wherein the plurality of advices are configured to be updated independently of any updates to the integration flow.

9. The method of claim 8,
    wherein the pattern is detected in the context of a component provided within the integration platform, the component being associated with an application.

10. The method of claim 9,
    wherein the providing of the advice is contingent upon the satisfaction of a rule associated with the component, of a plurality of rules defined at the advisory framework.

11. The method of claim 10,
    wherein the plurality of advices are associated with the component.

12. The method of claim 11,
    wherein the provided advice comprises a level, the level corresponding to a severity of the provided advice.

13. The method of claim 11, further comprising:
    receiving instructions indicative of an update to at least one advice of the plurality of advices, the at least one advice being associated with the component; and
    updating the at least one advice of the plurality of advices separate from any update to the associated component.

14. The method of claim 13,
    wherein the interface comprises a graphical user interface, the graphical user interface displaying a component configuration page corresponding to the component.

15. A non-transitory computer readable storage medium having instructions there for supporting a declarative non code self-learning advisory framework in an orchestration based application integration, which when read an executed cause a computer to perform steps comprising:
    providing a computer including one or more microprocessors;
    providing an integration platform running on the computer;
    providing an interface running on the computer, wherein the interface is associated with the integration platform;
    providing an advisory framework associated with the integration platform;
    monitoring, by the advisory framework, the integration platform for one or more defined events associated with an integration flow at the integration platform;
    upon detecting an event of the one or more defined events, detecting, by the advisory framework, a pattern of a plurality of defined patterns; and
    upon the detection of the pattern, providing, by the advisory framework, an advice selected from a plurality of advices stored at a memory accessible by the advisory framework, wherein the plurality of advices are configured to be updated independently of any updates to the integration flow.

16. The non-transitory computer readable storage medium of claim 15,
    wherein the pattern is detected in the context of a component provided within the integration platform, the component being associated with an application.

17. The non-transitory computer readable storage medium of claim 16,
    wherein the providing of the advice is contingent upon the satisfaction of a rule associated with the component, of a plurality of rules defined at the advisory framework.

18. The non-transitory computer readable storage medium of claim 17,
    wherein the plurality of advices are associated with the component.

19. The non-transitory computer readable storage medium of claim 18,
   wherein the provided advice comprises a level, the level corresponding to a severity of the provided advice.

20. The non-transitory computer readable storage medium of claim 18, the steps further comprising:
   receiving instructions indicative of an update to at least one advice of the plurality of advices, the at least one advice being associated with the component; and
   updating the at least one advice of the plurality of advices separate from any update to the associated component;
   wherein the interface comprises a graphical user interface, the graphical user interface displaying a component configuration page corresponding to the component.

\* \* \* \* \*

UNITED STATES PATENT AND TRADEMARK OFFICE
CERTIFICATE OF CORRECTION

PATENT NO. : 11,720,419 B2
APPLICATION NO. : 16/858271
DATED : August 8, 2023
INVENTOR(S) : Prakash It is certified that error appears in the above-identified patent and that said Letters Patent is hereby corrected as shown below:

In the Drawings

On sheet 3 of 9, in Figure 3, under Reference Numeral 309, Line 3, delete "Saleforce" and insert -- Salesforce --, therefor.

In the Specification

In Column 7, Line 43, delete "in on" and insert -- in --, therefor.

In Column 8, Line 33, delete "417" and insert -- 417. --, therefor.

In Column 9, Line 29, delete "517" and insert -- 517. --, therefor.

In Column 10, Line 33, delete "617" and insert -- 617. --, therefor.

In Column 14, Line 10, delete "clould." and insert -- cloud. --, therefor.

Signed and Sealed this
Twenty-eighth Day of May, 2024

Katherine Kelly Vidal

Katherine Kelly Vidal
*Director of the United States Patent and Trademark Office*